(12) United States Patent
Kuo

(10) Patent No.: US 7,310,184 B2
(45) Date of Patent: Dec. 18, 2007

(54) CYLINDRICAL BODY OF A NEWTON REFLECTIVE TELESCOPE

(75) Inventor: Paul Kuo, Tainan (TW)

(73) Assignee: Sun Long Optics Co., Ltd, Tainan (TW)

( * ) Notice: Subject to any disclaimer, the term of this patent is extended or adjusted under 35 U.S.C. 154(b) by 81 days.

(21) Appl. No.: 11/081,207

(22) Filed: Mar. 15, 2005

(65) Prior Publication Data
US 2006/0044649 A1    Mar. 2, 2006

(30) Foreign Application Priority Data
Aug. 26, 2004    (TW) ............................. 93213508 U

(51) Int. Cl.
*G02B 23/00*    (2006.01)
(52) U.S. Cl. .................. 359/399; 359/366; 359/405; 359/429
(58) Field of Classification Search ........ 359/399–432, 359/694–706, 503–506, 800–819
See application file for complete search history.

(56) References Cited

U.S. PATENT DOCUMENTS

| 1,635,011 | A | * | 7/1927 | Sadler .................. 359/406 |
| 5,044,738 | A | * | 9/1991 | Shaffer ................. 359/504 |
| 5,825,534 | A | * | 10/1998 | Strahle ................ 359/376 |
| 6,061,175 | A | * | 5/2000 | Watters ............... 359/366 |
| 6,122,099 | A | * | 9/2000 | Connors et al. ....... 359/400 |

* cited by examiner

*Primary Examiner*—Thong Q Nguyen
(74) *Attorney, Agent, or Firm*—Bacon & Thomas, PLLC

(57) ABSTRACT

A cylindrical body of a Newton reflective telescope includes a first cylindrical body and a second cylindrical body combined together. The first cylindrical body has an eyepiece fixed on an outer surface, and a reflective mirror fixed in its interior. A joint member is connected between the first and the second cylindrical body to enable the first cylindrical body to rotate relative to the second cylindrical body as a pivot in such a way that the first and the second cylindrical body have coincident center axes. Therefore, a person other than a first user can also look in the eyepieces by rotating the first cylindrical body without need for the first user to leave the location of the eyepiece.

3 Claims, 5 Drawing Sheets

CYLINDRICAL BODY OF A NEWTON REFLECTIVE TELESCOPE

BACKGROUND OF THE INVENTION

1. Field of the Invention

This invention relates to a cylindrical body of a Newton reflective telescope, particularly to one capable of letting persons other than a first user to use the same cylindrical body without need for the first user to leave the location of the eyepiece after the eyepiece has been focused.

2. Description of the Prior Art

A conventional Newton reflective telescope is shown in FIG. 1, having a cylindrical body 10, and an eyepiece 20 fixed vertically to the side of the cylindrical body 10, and a reflective mirror is fixed in the interior of the cylindrical body 10 for reflecting an image of a target so that a user can see the image reflected by the mirror through the eyepiece 20. In using the conventional Newton reflective telescope, the center axial of the cylindrical body 10 has to be adjusted to a target in advance, and then the eyepiece 20 is adjusted by altering the distance for focusing so the image of the target may seen through the eyepiece 20 clearly. However, if the user wants to share the telescope already in the focused condition with other persons, the user has to leave his location at the eyepiece 20 to let the other person move to the location of the eyepiece 20 to look through it. This is very inconvenient for operation or teaching students.

SUMMARY OF THE INVENTION

This invention has been devised to offer a cylindrical body of a Newton reflective telescope capable of letting persons in addition to a first user to share the eyepiece of the telescope without the necessity for the first user to leave the location of the eyepiece.

The feature of the invention is a cylindrical body consisting of a first and a second cylindrical body combined together. The first cylindrical body has an eyepiece fixed on its outer surface, and a reflective mirror fixed inside in relative to the eyepiece. A joint is provided between the first and the second cylindrical body to enable the first one to rotate with the second one as a pivot. Then even if the first cylindrical body is rotated, the first and the second cylindrical bodies can keep their axes aligned so as to maintain a focus of the eyepiece. Then other persons can look into the eyepiece by rotating the first cylindrical body to turn the eyepiece to the other side of the telescope without need for the first user to leave his position after the eyepiece has been focused on an image of a target.

BRIEF DESCRIPTION OF DRAWINGS

This invention will be better understood by referring to the accompanying drawings, wherein.

DETAILED DESCRIPTION OF THE PREFERRED EMBODIMENT

Figure 1:
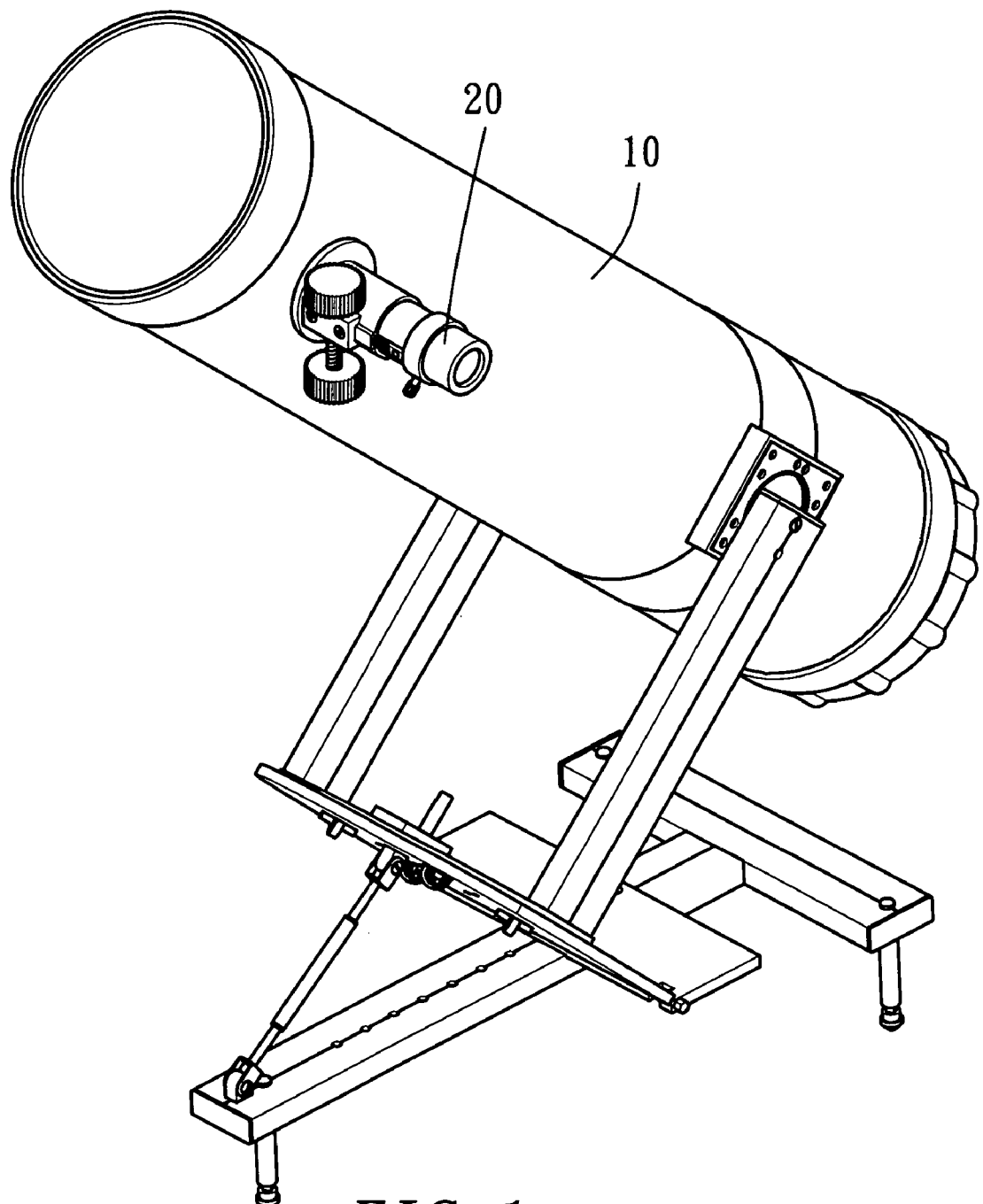
FIG. 1 is a perspective view of a conventional Newton reflective telescope.
Figure 2:
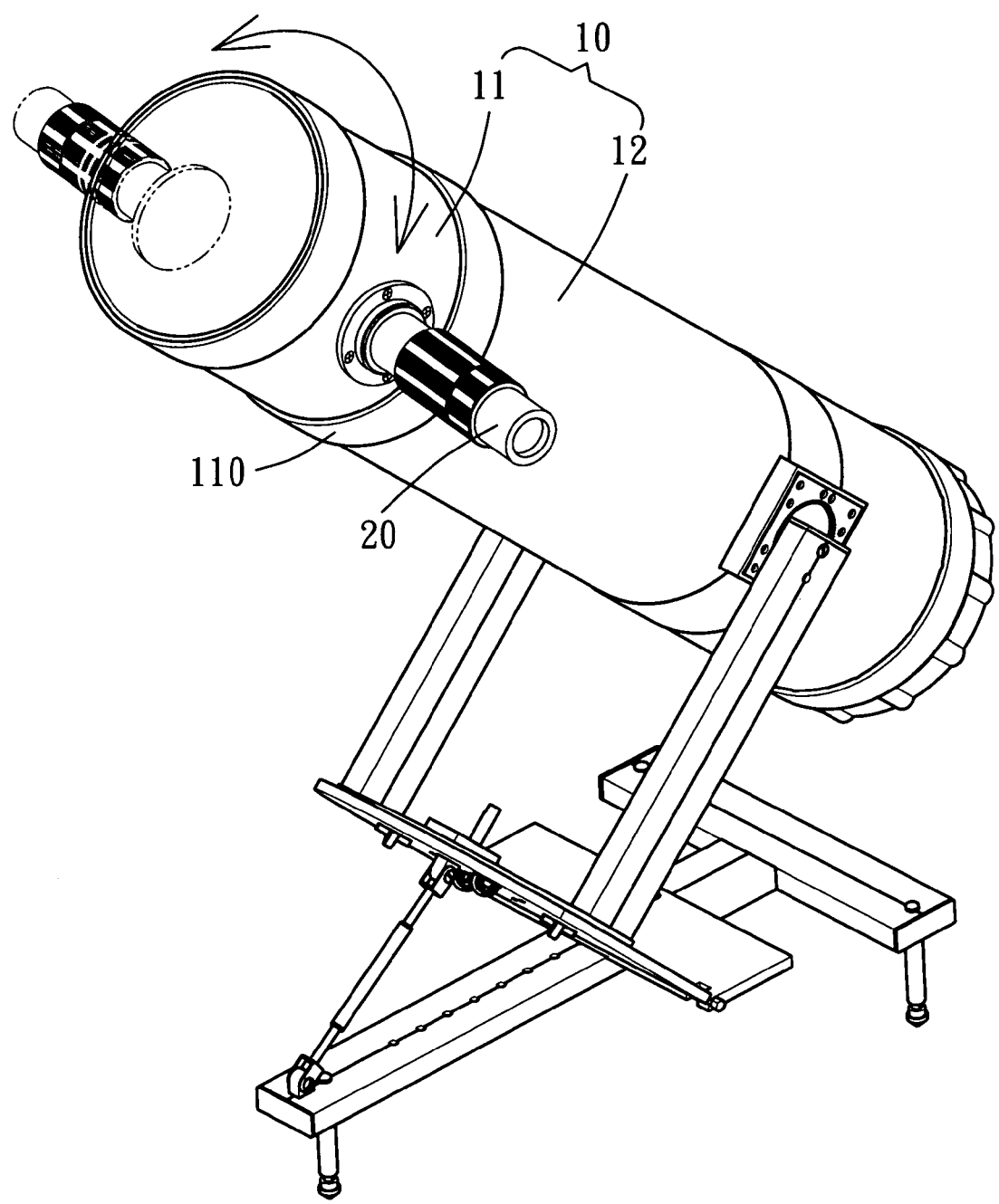
FIG. 2 is a perspective view of a Newton reflective telescope with a cylindrical body in the present invention.

A preferred embodiment of a cylindrical body of a Newton reflective telescope in according to the present invention, as shown in FIG. 2, includes a cylindrical body 10 and an eyepiece 20 fixed vertically on a sidewall of the cylindrical body 10. The cylindrical body 10 is consisted of a first cylindrical body 11 and a second cylindrical body 12 combined together by means of a joint member to let the first one 11 rotate relative to the second one 12 as a pivot.

Figure 3:
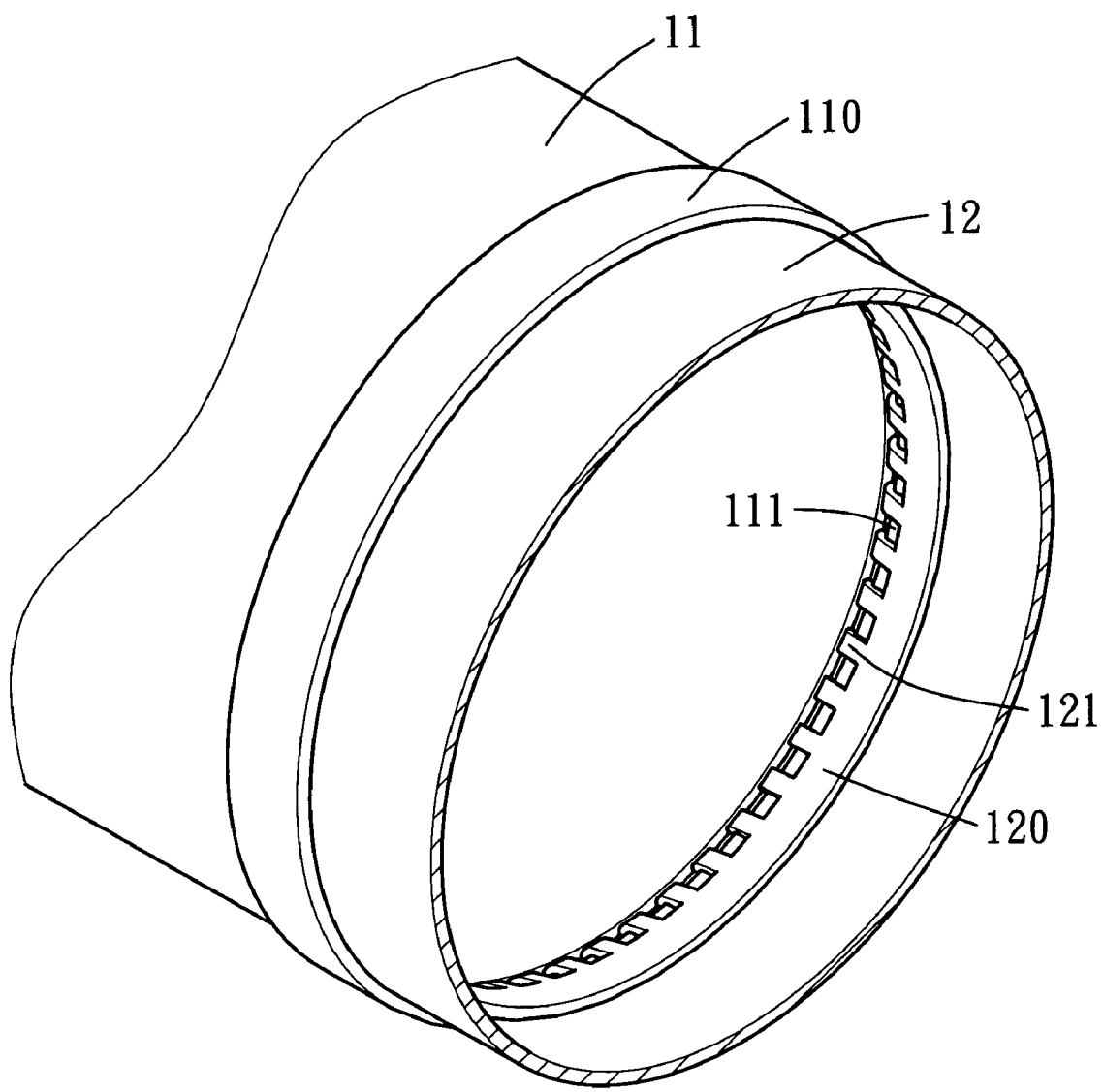
FIG. 3 is a perspective view of a combined portion of the cylindrical body of a Newton reflective telescope in the present invention.
Figure 4:
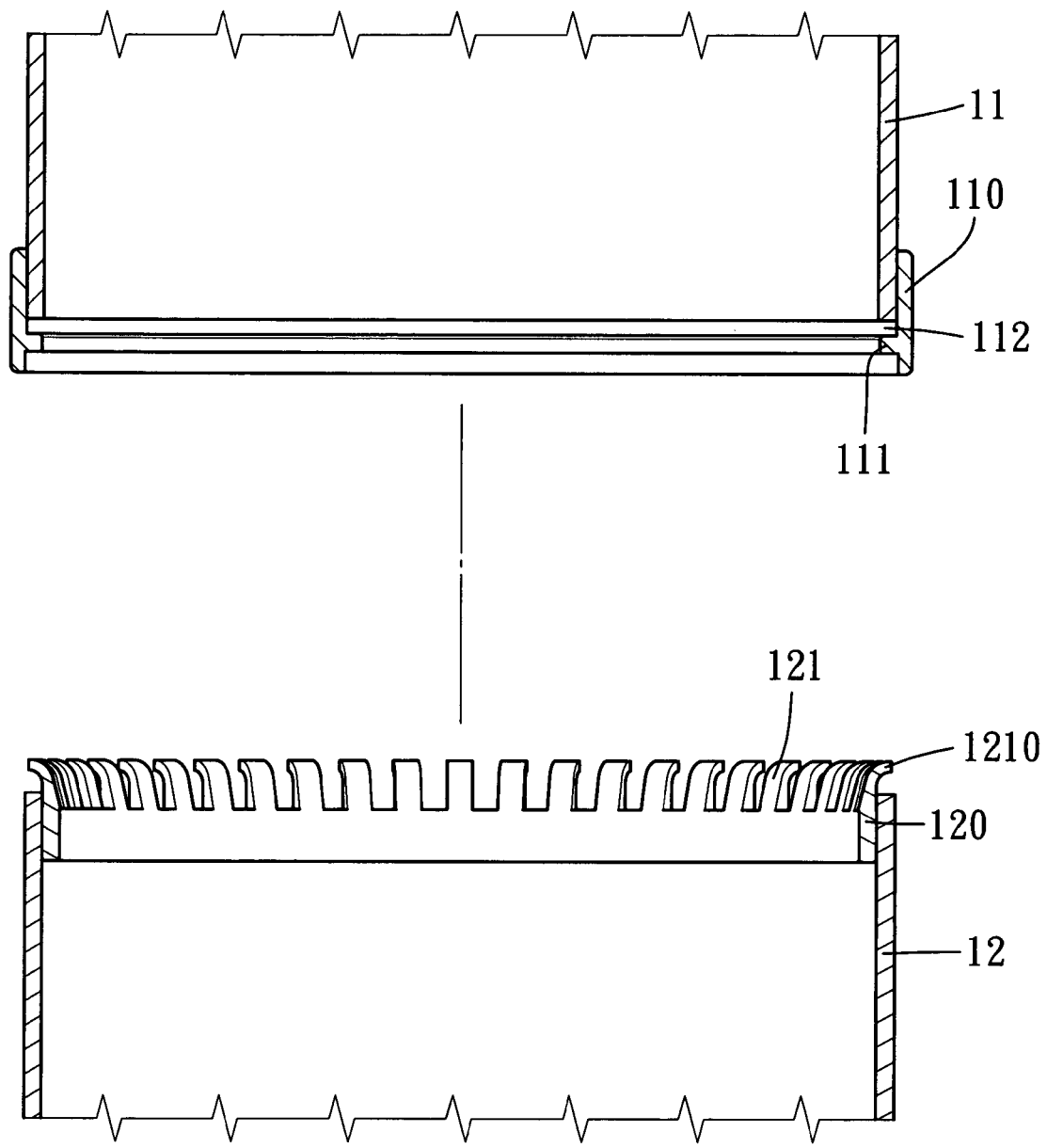
FIG. 4 is an partial exploded front view of the combined portion of the first and the second cylindrical bodies in the present invention; and, FIG. 5 is a cross-sectional view of the combined portion of the first and the second cylindrical bodies in the present invention.
Figure 5:
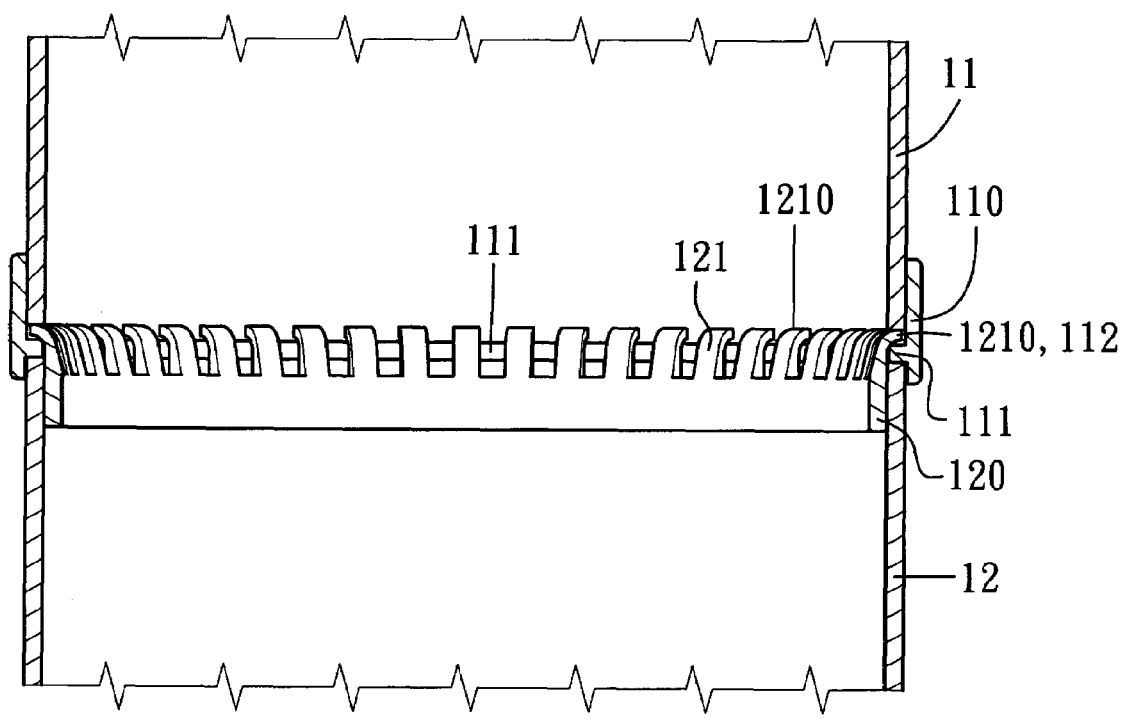

The first cylindrical body 11 has a reflective mirror fixed in its interior in such a condition that the eyepiece 20 may have a relative position to the reflective mirror kept constant regardless of the rotation of the first cylindrical body 11. As shown in FIGS. 3 and 4, the joint member is constituted by a fixing ring 110 fixed around a connecting end of the first cylindrical body 11, and an elastic ring 120 fixed around a connecting end of the second cylindrical body 12.

The fixing ring 110 has an annular projection 111 provided on an inner wall, and an annular fitting groove 112 formed on an upper side of the annular projection 111 for receiving the lower end of the first cylindrical body 11.

The second cylindrical body 12 has the elastic ring 120 as described above, and the elastic ring 120 has many elastic teeth 121 formed radially on an upper end and extending out of the second cylindrical body 12, and respectively having a curved tip 1210 flush with the outer surface of the second cylindrical body 12.

After the first cylindrical body 11 is combined with the second cylindrical body 12 by means of the joint member, the inner annular projection 111 of the fixing ring fixed around the first cylindrical body 11 contacts with the end edge of the second cylindrical body 12, with the curved tips 1210 of the elastic teeth 121 fitting stably in the fitting groove 112. Then the expanding-outward elasticity of the teeth 121 produces pressure against the inner annular projection 111 of the first cylindrical body 11 so the inner annular projection 111 may closely contact with the end edge of the second cylindrical body 12, without any gaps between the both. Therefore, no matter how far the first and the second cylindrical body 11 and 12 are adjusted in any angle relative to each other, the whole cylindrical body 10 has a constant same axis. Thus in using the telescope, after the eyepiece 20 has been adjusted and focused to a target, a first user does not need to leave his position to let another person look in the eyepiece 20 by rotating the first cylindrical body 11 to move the eyepiece to the other side of the telescope, as shown in FIG. 2. In this way the other person can easily share the eyepiece with the first user. In spite of the rotation of the first cylindrical body 11, the whole cylindrical body 10 can keep its axis invariable, without necessity of newly adjusting the cylindrical body 10 to be focused to the target, as needed in a conventional Newton reflective telescope.

While the preferred embodiment of the invention has been described above, it will be recognized and understood that various modifications may be made therein and the appended claims are intended to cover all such modifications that may fall within the spirit and scope of the invention.

What is claimed is:

1. A cylindrical body of a Newton reflective telescope, comprising a first cylindrical body and a second cylindrical body combined together, said first cylindrical body provided with an eyepiece on its outer surface, a joint member connected between said first and said second cylindrical bodies to let said first cylindrical body rotate with the second cylindrical body as a pivot, said first and second cylindrical bodies having coincident center axes that remain coincident even when said first cylindrical body is rotated relative to said second cylindrical body, wherein said joint member provided between said first and said second cylindrical bodies includes:

a fixing ring fixed around a connecting end of said first cylindrical body, said fixing ring having one end extending out of the connecting end and an inner annular projection formed in an inner wall, said fixing ring having an annular groove formed in its upper side:

an elastic ring fixed around a connecting end of said second cylindrical body, said elastic ring having many teeth formed radially in an upper end, each said tooth extending out of the connecting end and having a curved-out tip: and, said inner annular projection of said first cylindrical body contacting the end edge of said second cylindrical body, said curved-out tips of said teeth of said elastic ring of second cylindrical body fitting in said annular groove of said fixing ring of said first cylindrical body, said elastic ring of said second cylindrical body having an expanding-out pressure against said inner annular projection of said fixing ring of said first cylindrical body so that said annular projection closely and without any gap contacts the end edge of the connecting end of said second cylindrical body, wherein when said first cylindrical body is rotated relative to said second cylindrical body, said eyepiece rotates with the first cylindrical body from a first position to a second position without affecting the coincidence of the axes of the first and second cylindrical bodies, thereby permitting a first user to look through the eyepiece at the first position and a person other than the first user to look through the eyepiece at the second position, without having to change the focus of the eyepiece and without the first user having to move to a different position.

2. The cylindrical body of a Newton reflective telescope as claimed in claim 1, wherein the curved-out tips of said teeth of said elastic ring are always flush with an outer surface of said second cylindrical body.

3. The cylindrical body of a Newton reflective telescope as claimed in claim 1, wherein said eyepiece is fixed on said first cylindrical body.

* * * * *